Aug. 5, 1930.                  L. LIVINGS                 1,772,010
                                LUBRICATOR
                            Filed Aug. 22, 1927
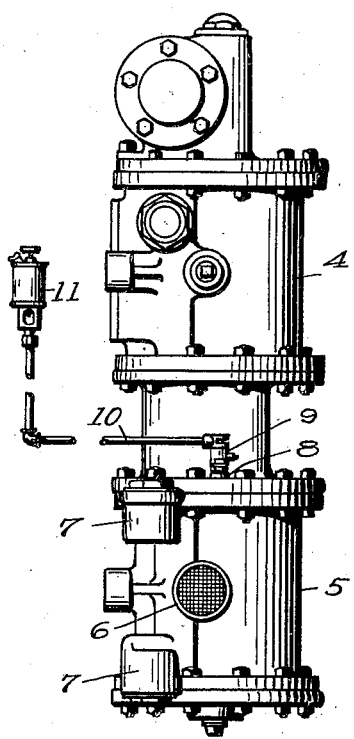
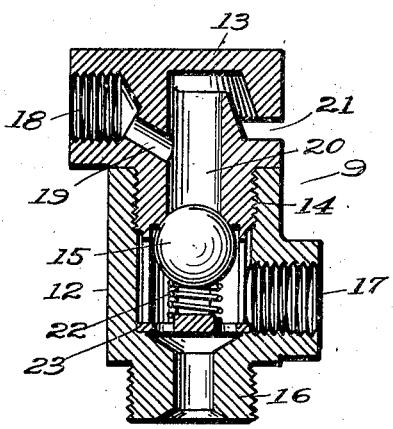
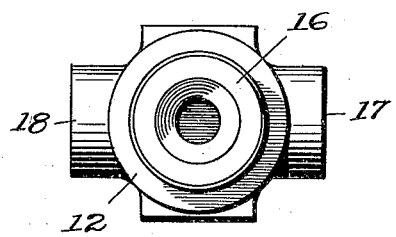
Inventor
Lloyd Livings.
Atty.

Patented Aug. 5, 1930

1,772,010

UNITED STATES PATENT OFFICE

LLOYD LIVINGS, OF PEORIA, ILLINOIS

LUBRICATOR

Application filed August 22, 1927. Serial No. 214,470.

My invention relates more particularly to a lubricant distributor for use on the air cylinders of railway locomotive air compressors, though it is capable of advantageous use for a variety of other purposes as will be readily apparent to those skilled in the art to which my device appertains.

One object of my invention is the provision of a device to be mounted adjacent the point from which it is desired to distribute the lubricant and to deliver to the device a regulated supply of lubricant so that at the proper intervals, the device may operate to properly perform its function of distribution.

Another object of my invention is to provide a device whereby a relatively small amount of lubricant will accomplish thorough lubrication without making it necessary to supply an excess of lubricant, which excess is very objectionable when considered in connection with the air brake systems used on railway equipment, not only from the standpoint of the cost of wasted lubricant, but also from the fact that the excess lubricant is carried over into the train pipes, reservoirs, and triple and other valve mechanism of the braking systems and seriously interferes with the proper functioning of these devices.

Other objects of my invention will appear and be described in the specification.

The novelty of my invention will be hereinafter more fully set forth and specifically pointed out in the claims.

In the accompanying drawing, Fig. 1 is a side view of a typical steam driven air pump such as used on locomotives, and showing my lubricator attached thereto.

Fig. 2 is a central sectional side elevation of my device.

Fig. 3 is a bottom plan view of Fig. 2.

The same numerals of reference are used to indicate identical parts in all the figures.

For the purpose of better illustrating the method of mounting and connecting my device, I have shown in Fig. 1, an air pump comprising a steam cylinder 4 which is provided with its usual equipment of valves and connections and which carries the air pump cylinder 5, the latter being provided with the usual inlet 6 which communicates with the inlet valve chamber 7, the latter in turn communicating with the interior of the cylinder. The pump cylinder is also provided with the discharge valves and piston and other parts for its proper operation.

A boss 8 is usually provided adjacent the upper inlet air valve and this boss is usually threaded to receive one or the other of the forms of lubricators for supplying oil to the inside of the cylinder of the pump, and to this boss I attach my device shown at 9 in Fig. 1, and connect it through any suitable pipe 10 to a sight feed or other lubricant supplying reservoir 11 which may be located in the cab of the engine or at any other convenient place thereon.

Referring now to Figs. 2 and 3, my lubricator consists primarily of a body portion 12 and a top portion 13, which are joined together as by threads 14, and a ball or other suitable check valve 15 which normally closes the passageways between the two portions.

The body portion 12 is provided with an externally threaded boss 16 by means of which the device is mounted on the compressor, and an internally threaded boss 17 which may be used as a lubricant supply passage with certain types of supply reservoirs, the interior of the body portion being bored out to receive the top portion 13 and its associated parts.

The top portion 13 is provided with an internally threaded boss 18 from which a lubricant passage 19 leads to the central bore 20, the lower end of which is closed by the check valve 15, while the upper end terminates in a hooded air admission opening 21.

The check valve 15 is normally held to its seat by a light coil spring 22 which is supported upon a perforated disc 23 which rests in the bottom of the cylindrical part of the bore of the body 12.

There are two types of lubricant reservoirs which may be used in connection with this device, namely, a reservoir capable of withstanding the air pressure produced by the pump, and provided with means for regulating the supply of lubricant which it passes to the pump, this type of reservoir being connected by suitable piping to the boss 17; the other type of reservoir, and the type which I prefer, being merely a reservoir capable of containing lubricant and provided with delivery regulating means such a reservoir being the ordinary type of sight feed oil cup such as shown at 11 in Fig. 1, this reservoir being connected by suitable piping to the boss 18. Where the lubricant reservoir is connected to the boss 18, it is necessary that the boss 17 be plugged to prevent the escape of the compressed air on the compression stroke of the pump.

The operation of the device is as follows, assuming it to be connected to the pump cylinder and assuming a lubricant reservoir connected to the boss 18. At each suction stroke of the piston of the pump the check valve 15 is drawn off its seat and a quantity of air rushes in to the cylinder through the opening 21, carrying with it and throughout atomizing the oil which enters through the passage 19 and this spray of oil and air is distributed throughout the whole interior surface of the cylinder and thoroughly lubricates the cylinder walls and the piston rings, the distribution being assisted by the inrush of air through the inlet valve. Upon the compression stroke of the pump the check valve 15 closes and the device remains inactive until the next suction stroke.

By regulating the supply of oil to the device, the cylinder walls may be kept in a condition of perfect lubrication without requiring the supply of any oil beyond the amount required for proper lubrication.

In those cases where the lubricant reservoir is attached to the boss 17, the oil is delivered into the stream of air passing through the device at a point below the check valve 15 and while a connection made at this point is entirely practical and will accomplish successful and proper lubrication, I prefer the attachment of the lubricant reservoir above the check valve for the reason that the capacity of the pump is not reduced by adding to its clearance volume the cubical contents of the pipe leading to the lubricant reservoir.

Another objection to connecting the lubricant reservoir to the boss 17 is that in the event of a failure to close the regulating valve of the lubricant reservoir when the pump is not in operation, oil will continuously flow into the pump cylinder and this oil will be carried over into the reservoirs and other brake apparatus when the pump is again set in motion, though this condition cannot occur where the reservoir is connected to the boss 18 for the reason that if the supply of oil continues when the pump is shut down, the excess oil fills the passage 20 and overflows through the opening 21 but does not pass into the pump cylinder and into the brake apparatus.

With the systems of lubrication in use at present on these pumps, oil is fed in liquid form to the air cylinder at one point in its circumference, with the result that a relatively narrow band of the cylinder wall receives all of the oil while the balance of the wall remains in a dry condition and in order to lubricate the cylinder wall over its entire surface it is necessary to feed an amount of oil greatly in excess of what would be required if proper distribution conditions existed, and this excess of oil makes it necessary to clean the triple valves and the other brake apparatus much more frequently than would be required otherwise, thereby greatly increasing the cost of maintenance.

With my device these objections are overcome and it has been found that a very small quantity of oil is sufficient to keep the pump operating in proper condition, thereby effecting a material saving not only in the amount of oil used but in prolonging the periods for cleaning the brake operating valves and other parts of the braking system. Another objection to oil accumulations in the braking system is that in cold weather the oil congeals and seriously interferes with the proper operation of the triple valve and frequently causes these valves to either fail to function or retards their action until a sufficient differential in pressure is produced to cause them to act whereupon they move to emergency brake application position instead of moving properly with the change in train line pressure. By the use of my device this injurious condition is eliminated.

It will be seen from the above that I have produced a device which is simple in construction, of few parts, not likely to cause trouble in use, and by the use of which the difficulties surrounding present methods of lubricating air pump cylinders are overcome.

Having thus fully described my invention, I claim:

1. In a lubricator the combination of a body portion mounted upon a compressor, a top portion carried by the body portion, a hooded relatively large and short air passage through the top portion, a passage of approximately the same area as the air passage through the body portion, a relatively small lubricant passage opening into the air passage at an angle to the flow of air through the device, and a check valve normally closing the passage through the lubricator.

2. In a lubricator the combination of a body portion to be mounted on the cylinder of a compressor, a top portion carried by the body portion, a relatively large and short air passage through the top portion, a passage of approximately the same area through the body portion, both passages being in substantial alignment whereby the least resistance will be offered to the free passage of air, a relatively small lubricating admitting passage opening into the air admitting passage in such a direction that movement of air through the device will assist the flow of lubricant, and a check valve normally closing the air admitting passage.

LLOYD LIVINGS.